United States Patent
Perry (10) Patent No.: US 10,899,526 B2
(45) Date of Patent: Jan. 26, 2021

(54) PERISHABLE PARTICLE COMPRESSION CONTAINER

(71) Applicant: Lonnie L. Perry, New Port Richey, FL (US)

(72) Inventor: Lonnie L. Perry, New Port Richey, FL (US)

(73) Assignee: United Southern Container LLC, New Port Richey, FL (US)

( * ) Notice: Subject to any disclaimer, the term of this patent is extended or adjusted under 35 U.S.C. 154(b) by 73 days.

(21) Appl. No.: 15/942,038

(22) Filed: Mar. 30, 2018

(65) Prior Publication Data

US 2018/0282045 A1  Oct. 4, 2018

Related U.S. Application Data

(60) Provisional application No. 62/478,893, filed on Mar. 30, 2017.

(51) Int. Cl.
  *B65D 81/24* (2006.01)
  *A24F 23/00* (2006.01)
  *A47J 47/06* (2006.01)
  *B65D 43/02* (2006.01)
  (Continued)

(52) U.S. Cl.
  CPC .............. *B65D 81/24* (2013.01); *A24F 23/00* (2013.01); *A47J 47/06* (2013.01); *B65D 21/08* (2013.01); *B65D 25/06* (2013.01); *B65D 43/0212* (2013.01); *B65D 81/245* (2013.01); *B65D 2543/0025* (2013.01); *B65D 2543/0074* (2013.01); *B65D 2543/00092* (2013.01); *B65D 2543/00296* (2013.01); *B65D 2543/00527* (2013.01); *B65D 2543/00537* (2013.01); *B65D 2543/00629* (2013.01); *B65D 2543/00685* (2013.01); *B65D 2543/00796* (2013.01); *B65D 2543/00842* (2013.01)

(58) Field of Classification Search
  CPC ...... B65D 81/24; B65D 81/245; B65D 21/08; B65D 25/06; A24F 23/00; A47J 47/06
  USPC ............... 220/578, 796, 799, 805, 780, 786; 206/236, 242, 37, 265; 131/329, 112
  See application file for complete search history.

(56) References Cited

U.S. PATENT DOCUMENTS

2,092,219 A * 9/1937 Knox ...................... A24F 23/00
                                                206/236
4,646,933 A * 3/1987 Jurczenia ........... B65D 51/1666
                                                220/366.1
(Continued)

*Primary Examiner* — Fenn C Mathew
*Assistant Examiner* — Jennifer Castriotta
(74) *Attorney, Agent, or Firm* — Smith & Hopen, P.A.; Paul Murty (57) ABSTRACT

A perishable particle compression container stores and preserves a quantity of perishable particles, such as dry good particulates, coffee, tea, or tobacco. The compression container includes a container body and a lid. The container body includes a container-compression blade connected to a lateral wall, a container base, and a container-blade support. The lid includes a lid-compression blade connected to a lid base, and a lid-blade support. The lid-compression blade is positioned within the container body as the lid engages the container body. The lid pivots about the container body to allow the lid-compression blade to rotate around the container-blade support and compress the perishable particles within the container body.

5 Claims, 9 Drawing Sheets

(51) Int. Cl.
*B65D 21/08* (2006.01)
*B65D 25/06* (2006.01)

(56) References Cited

U.S. PATENT DOCUMENTS

| | | | |
|---|---|---|---|
| 2009/0266370 A1* | 10/2009 | Smith, IV | A24F 23/00 |
| | | | 131/329 |
| 2010/0065077 A1* | 3/2010 | Lofgreen-Ohrn | A24F 23/00 |
| | | | 131/329 |
| 2010/0101186 A1* | 4/2010 | Cronin | B65D 21/08 |
| | | | 53/436 |
| 2011/0155753 A1* | 6/2011 | Noer | B65D 11/08 |
| | | | 220/796 |

* cited by examiner

PERISHABLE PARTICLE COMPRESSION CONTAINER

The current application claims a priority to the U.S. Provisional Patent application Ser. No. 62/478,893 filed on Mar. 30, 2017.

FIELD OF THE INVENTION

The present invention relates generally to an apparatus for a compression container. More specifically, the present invention is an apparatus for a compression container that keeps products fresh by compressing the product and removing as much air as possible from the container.

BACKGROUND OF THE INVENTION

Preserving perishable items increases the longevity of the items by prolonging decomposition. Food and Dry Good Particulates preservation in restaurants is essential when promoting and serving food to customers. Food preservation at home is equally as important when providing food for families and keeping the family healthy. A common problem is the inability to preserve food with common containers. This leads to spoiled food and an increased health risk if the food is consumed.

The present invention is a perishable particle compression container. An objective of the present invention is to introduce an apparatus for a compression container that keeps products fresh by compressing the product and removing as much air as possible from the container. The present invention utilizes a container compression blade and a lid compression blade to compress the product within the present invention between the container compression blade and the lid compression blade, limiting the air exposure of the contents. Products, such as dry good particulates, tobacco, tea, or coffee, are able to be preserved within the present invention.

DETAIL DESCRIPTIONS OF THE INVENTION

All illustrations of the drawings are for the purpose of describing selected versions of the present invention and are not intended to limit the scope of the present invention.

The present invention is a perishable particle compression container. The present invention is a container that compresses perishable particles to increase the longevity of the perishable particles stored within the present invention. Perishable particles include, but are not limited to coffee particles, tea particles, tobacco particles, or other loose particles subject to decomposition. The present invention reduces the void space between the particles to limit the air exposure to the particles. By limiting the air exposure, the particles will decompose at a slower rate in the absence of air, and, therefore, will have an increased longevity.

Figure 1:
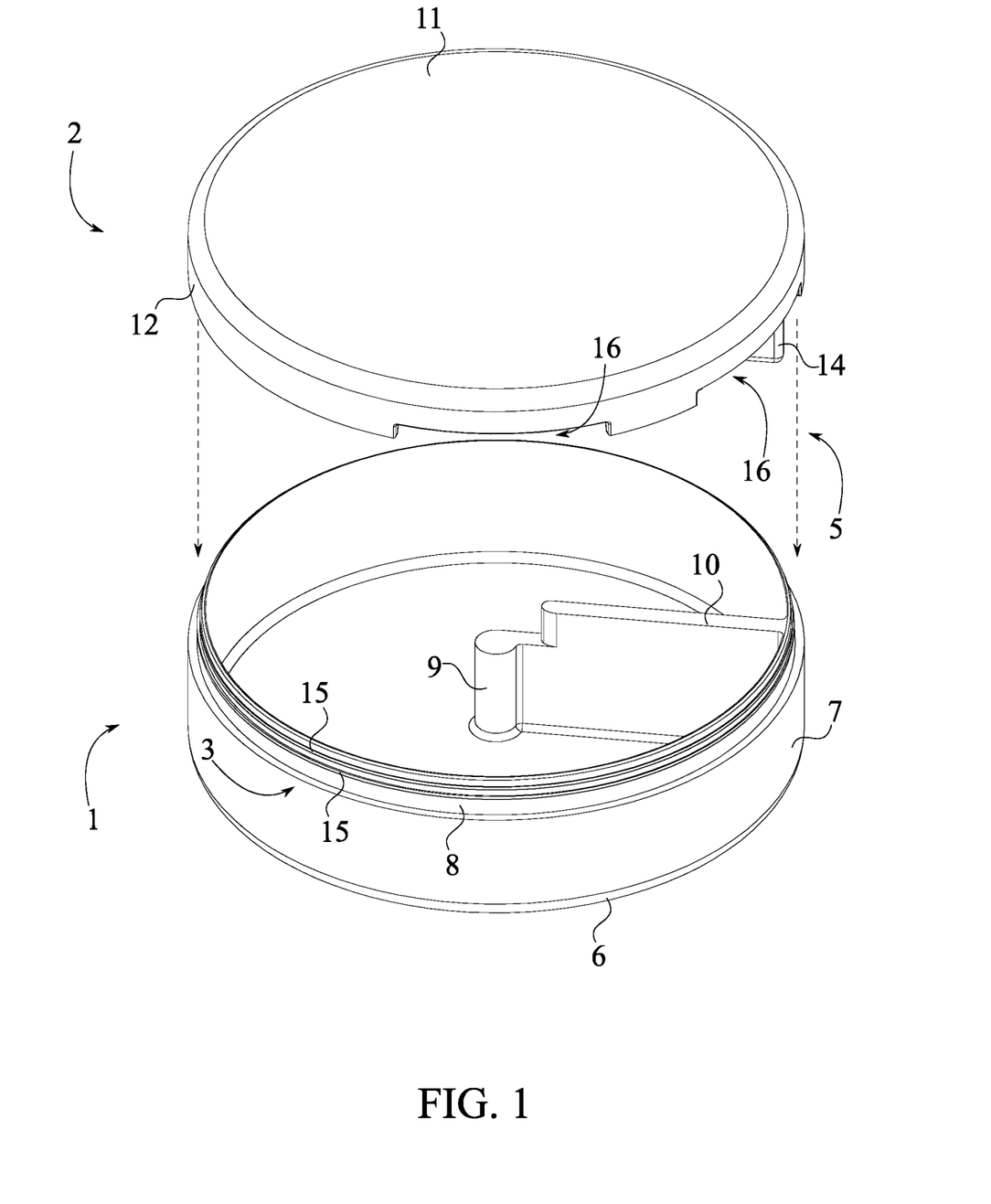
FIG. 1 is a perspective view of the present invention, wherein the lid is removed from the container body.
Figure 2:
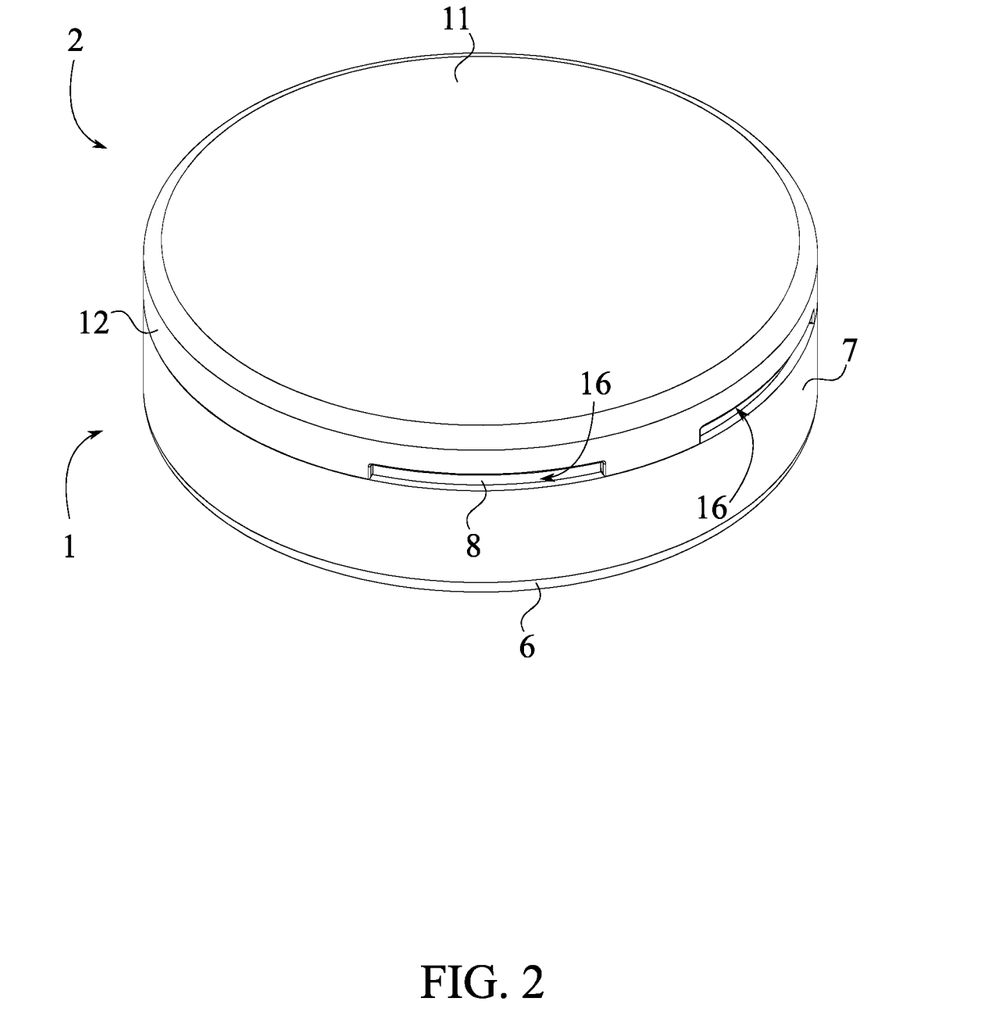
FIG. 2 is a perspective view of the present invention, wherein the lid engages the container body.
Figure 3:
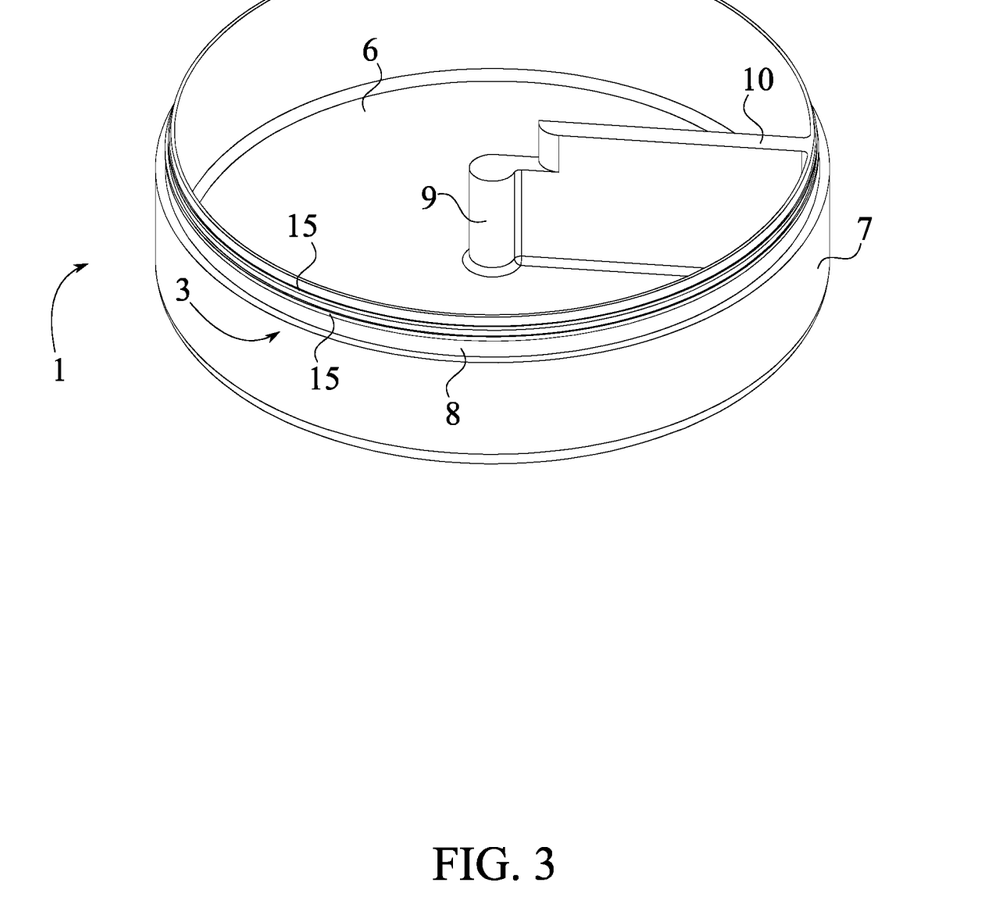
FIG. 3 is a perspective view of the container body.

In accordance to FIG. 1 and FIG. 2, the present invention comprises a container body 1 and a lid 2. The container body 1 provides a storage volume to retain a quantity of perishable particles. The container body 1 comprises a container base 6, a lateral wall 7, a lid-mounting extrusion 8, a container-blade support 9, and a container-compression blade 10, as shown in FIG. 3. The container base 6, the lateral wall 7, and the lid-mounting extrusion 8 delineate a storage volume. The lateral wall 7 is perimetrically connected to the container base 6, detailed in FIG. 4. The lid-mounting extrusion 8 is adjacently connected around the lateral wall 7, opposite to the container base 6, to define the storage volume. The lid-mounting extrusion 8 receives the lid 2 to enclose the storage volume and prevent the contents from being dislodged from the present invention unintendedly. The container-blade support 9 supports the container-compression blade 10 within the container body 1. The container-blade support 9 is centrally and perpendicularly connected to the container base 6, shown in FIG. 2 and FIG. 3. The container-blade support 9 and the lateral wall 7 are oriented in the same direction. The container-compression blade 10 is adjacently connected to the container-blade support 9, the container base 6, the lateral wall 7, and the lid-mounting extrusion 8. The container-compression blade 10 is a support that the perishable particles are pressed against to allow for the perishable particles to be compressed.

Figure 8:
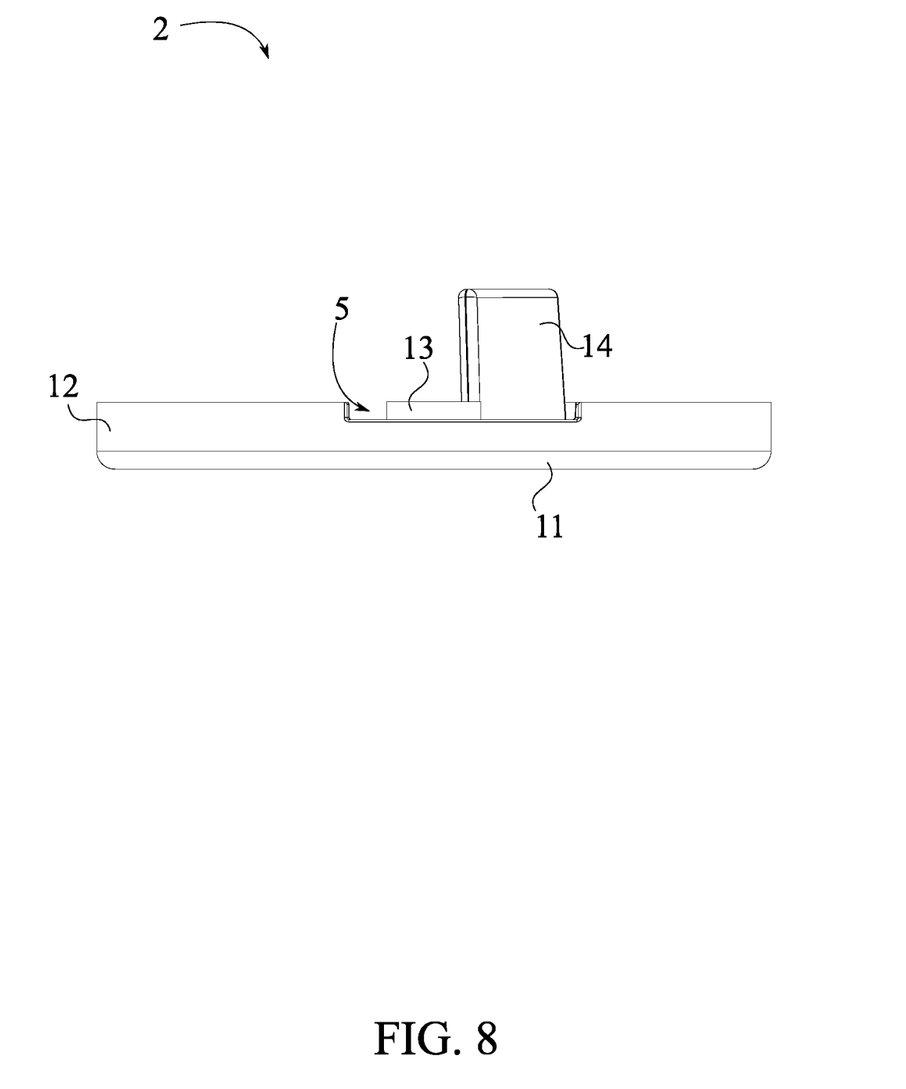
FIG. 8 is a side view of the container body.
Figure 9:
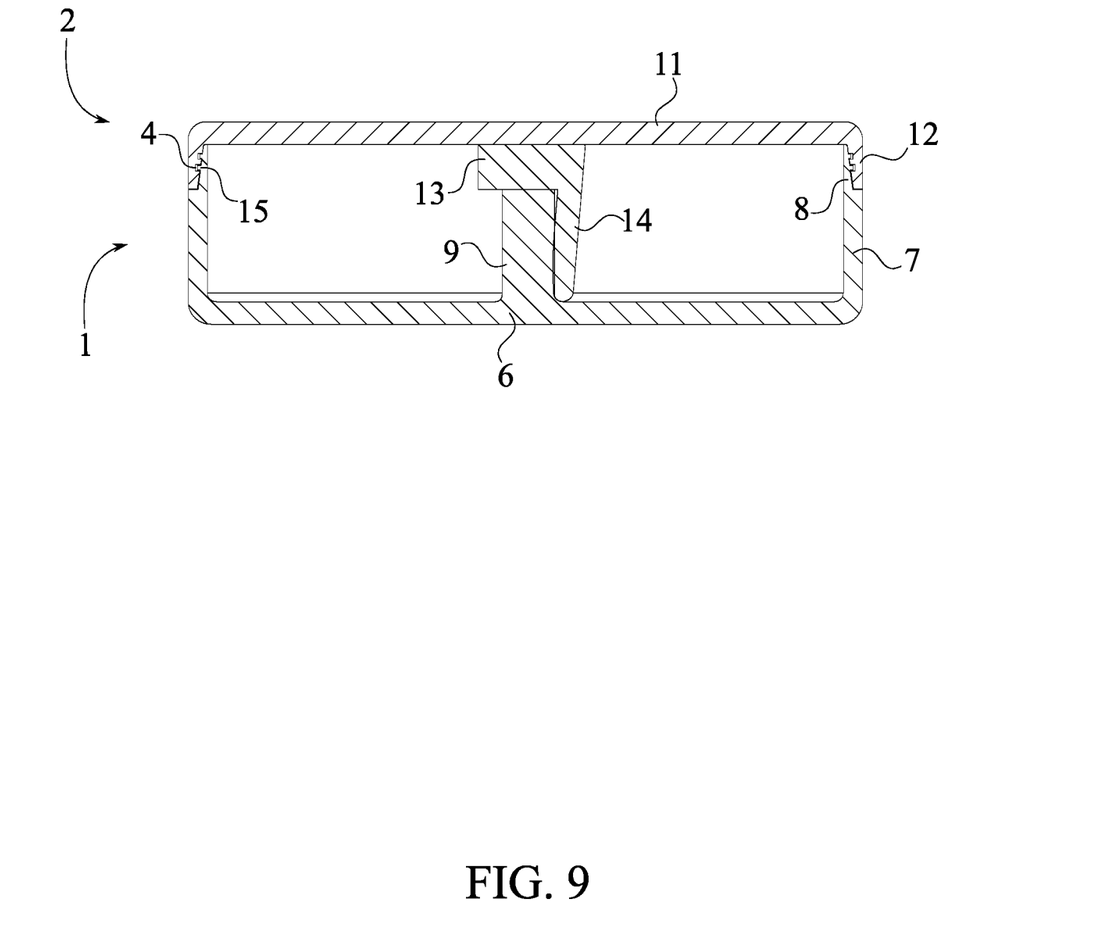
FIG. 9 is a schematic view of the present invention, wherein the lid engages the container body.

The user presses the lid 2 onto the lid-mounting extrusion 8 to couple the lid 2 with the container body 1. The lid 2 comprises a lid base 11, a container-mounting extrusion 12, a lid-blade support 13, and a lid-compression blade 14, in accordance to FIG. 6 and FIG. 7. The lid base 11 encloses the storage volume as the lid 2 engages the container body 1. The container-mounting extrusion 12 allows the lid 2 to be secured to the container body 1, as shown in FIG. 9. The container-mounting extrusion 12 is perimetrically connected to the lid base 11, detailed in FIG. 7. The lid-blade support 13 provides structural support to the lid-compression blade 14. The lid-blade support 13 is centrally and perpendicularly connected to the lid base 11, in accordance to FIG. 8, to allow the lid 2 to rotate about the lid-mounting extrusion 8 when the lid 2 engages the container body 1. The lid-blade support 13 and the container-mounting extrusion 12 are oriented in the same direction to mount the lid 2 onto the container body 1 and position the lid-compression blade 14 within the container body 1. The lid-compression blade 14 is actuated by the user rotating the lid 2. By rotating the lid 2, the lid-compression blade 14 presses the perishable particles against the container-compression blade 10, in order to compact the perishable particles. The lid-compression blade 14 is adjacently connected to the lid-blade support 13 and the lid base 11. In accordance to the preferred embodiment, the lid-compression blade 14 is oriented towards the container-mounting extrusion 12. Thus, when the lid-compression blade 14 is positioned within the container body 1, the lid-compression blade 14 is positioned adjacent to the lateral wall 7. The lid-compression blade 14 is oriented away from the lid base 11, allowing the lid-compression blade 14 is positioned adjacent to the container base 6 when the when the lid-compression blade 14 is positioned within the container body 1. The container-mounting extrusion 12 selectively engages the lid-mounting extrusion 8 to enclose the storage volume.

In accordance to the preferred embodiment of the present invention, the present invention comprises an at least one lid fastening extrusion 3 and a fastening channel 4 to further secure the lid 2 to the container body 1, shown in FIG. 9. The at least one lid fastening extrusion 3 is perimetrically connected to the lid-mounting extrusion 8, detailed in FIG. 4. The fastening channel 4 perimetrically and internally traverses into the container-mounting extrusion 12, detailed in FIG. 6. The at least one lid fastening extrusion 3 is positioned into the fastening channel 4, wherein the container-mounting extrusion 12 engages the lid-mounting extrusion 8, in accordance to FIG. 9. As the user presses the lid 2 onto the lid-mounting extrusion 8, the container-mounting extrusion 12 slides over the at least one lid fastening extrusion 3. The at least one lid fastening extrusion 3 is then seated within the fastening channel 4 as the lid 2 pressed farther towards the lateral wall 7.

Figure 5:
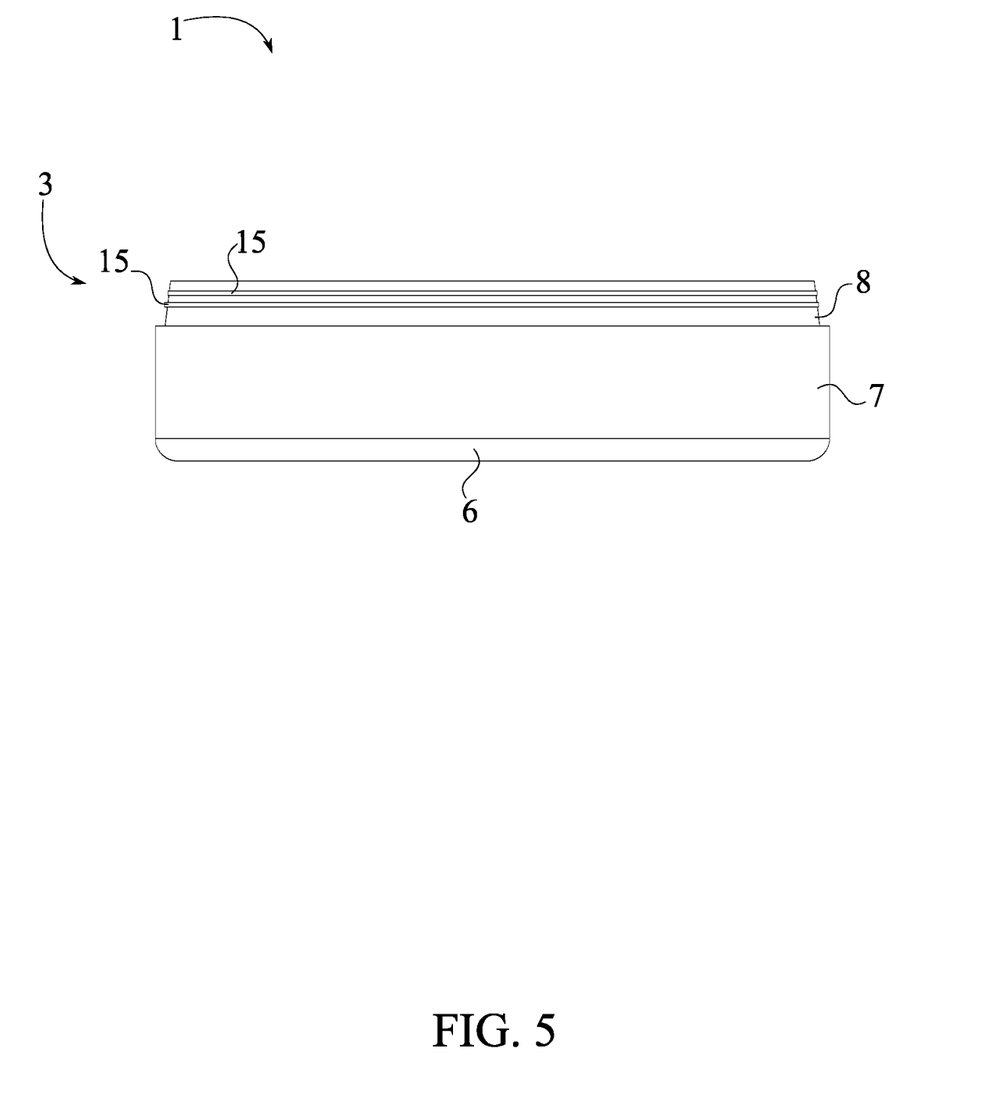
FIG. 5 is a side view of the container body.

Further in accordance to the preferred embodiment of the present invention, the at least one lid fastening extrusion 3 is a pair of fastening extrusions 15, detailed in FIG. 5. The pair of fastening extrusions 15 allows for the lid 2 to be mounted onto the container body 1 in tiers, to prevent the lid 2 from being dislodged from the container body 1 and to prevent the lid 2 from pivoting about the container body 1. The pair of fastening extrusions 15 are offset from each other. A second fastening extrusion of the pair of fastening is positioned between a first fastening extrusion of the pair of fastening and the lateral wall 7. As the user presses the lid 2 onto the container body 1, the fastening channel 4 initially engages the first fastening extrusion. The first fastening extrusion allows the lid 2 to pivot about the container body 1 while the lid 2 is secured to the container body 1. As the user further presses the lid 2 towards the lateral wall 7, the first fastening extrusion is dislodged from the fastening channel 4 and the second fastening extrusion engages the fastening channel 4. The second fastening extrusion prevents the lid 2 from pivoting by exerting pressure on the lid 2. Further, the lid-mounting extrusion 8 is preferred to be tapered towards the container-blade support 9 to allow the lid 2 to pivot while the fastening channel 4 is engaged with the first fastening extrusion and restrained while the fastening channel 4 is engaged with the second fastening extrusion.

As the container mounting extrusion engages the lid-mounting extrusion 8, the lid-compression blade 14 is positioned within the lateral wall 7, shown in FIG. 9. The lid-blade support 13 is positioned adjacent to the container-blade support 9. The lid-blade support 13 is concentrically positioned adjacent with the container-blade support 9. This configuration allows the lid-compression blade 14 to sweep the perishable particles towards the container-compression blade 10 as the user pivots the lid 2 about the lid-mounting extrusion 8.

Figure 6:
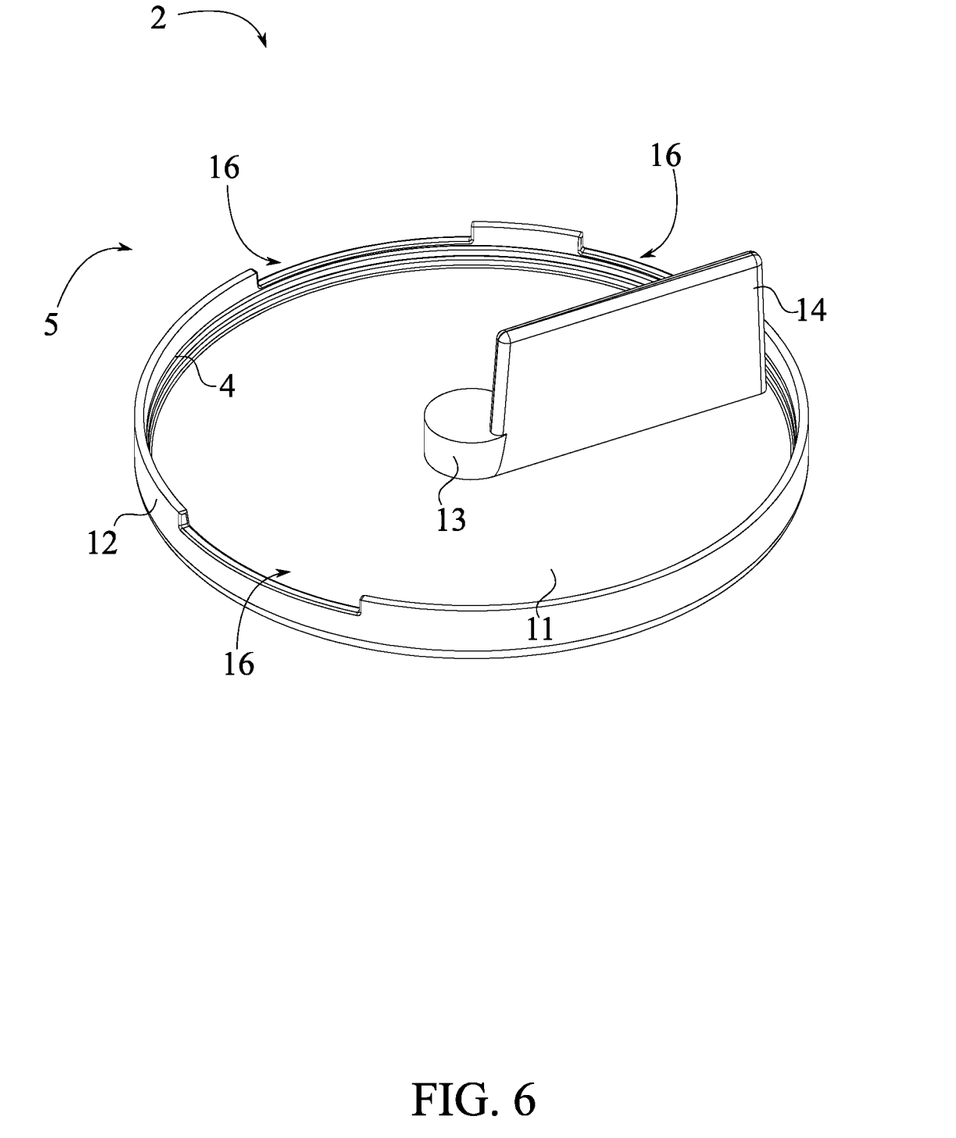
FIG. 6 is a bottom perspective view of the lid.
Figure 7:
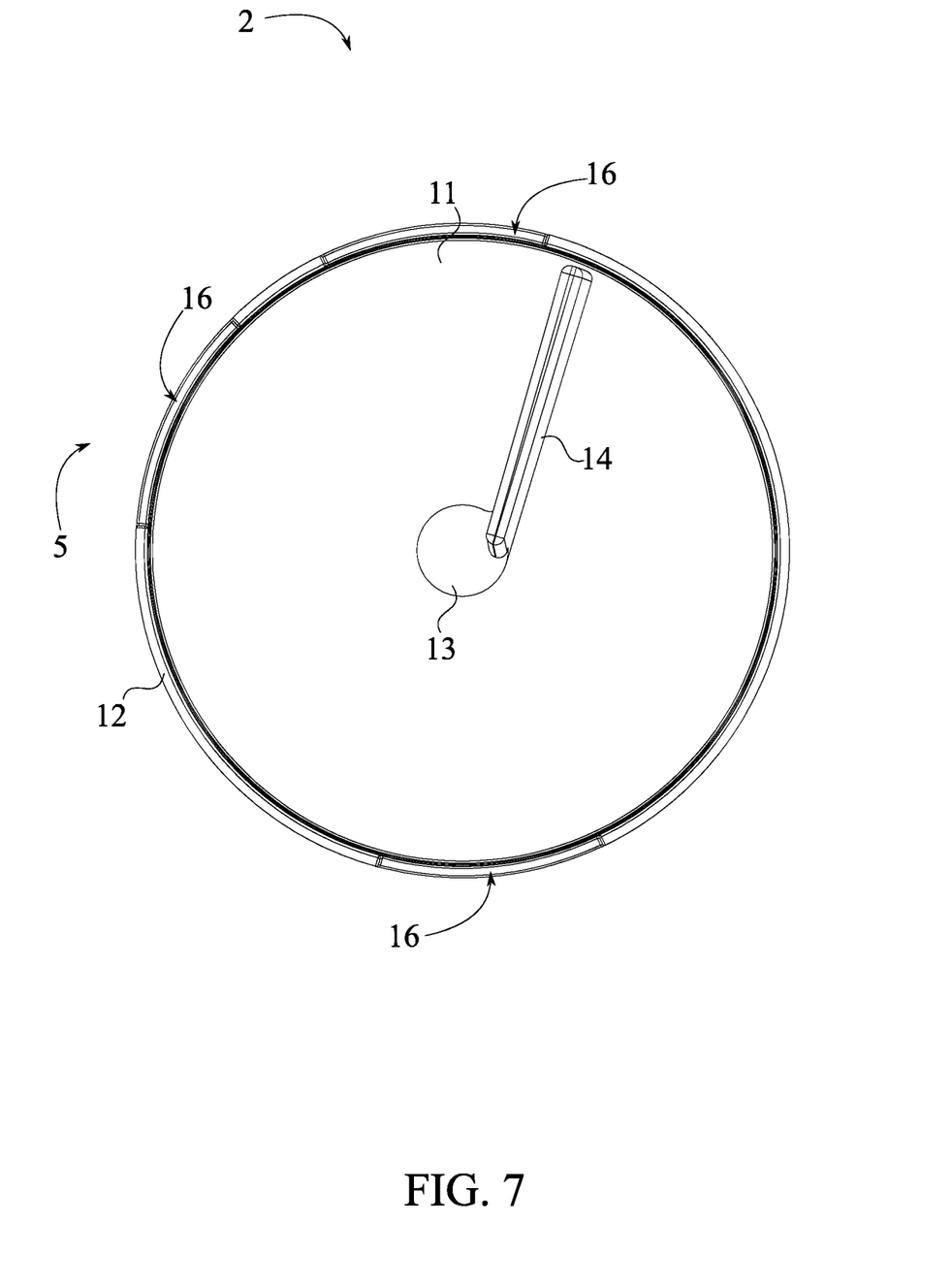
FIG. 7 is a top view of the lid.

Further in accordance to the preferred embodiment of the present invention, the present invention comprises an at least one grip opening 5, detailed in FIG. 1, FIG. 6, and FIG. 7. The at least one grip opening 5 allows the user to separate the lid 2 from the container body 1 efficiently. The at least one grip opening 5 traverses through the container-mounting extrusion 12 to provide an opening for the user to position a fingertip within to allow the user to grip the lid 2. The fastening channel 4 is positioned between the at least one grip opening 5 and the lid base 11 to prevent air from traversing through the at least one grip opening 5 and into the container body 1. More specifically, the at least one grip opening 5 comprises a plurality of digit openings 16. Each digit opening is perimetrically offset with another about the container-mounting extrusion 12 to allow the user to grasp the lid 2 ergonomically.

Figure 4:
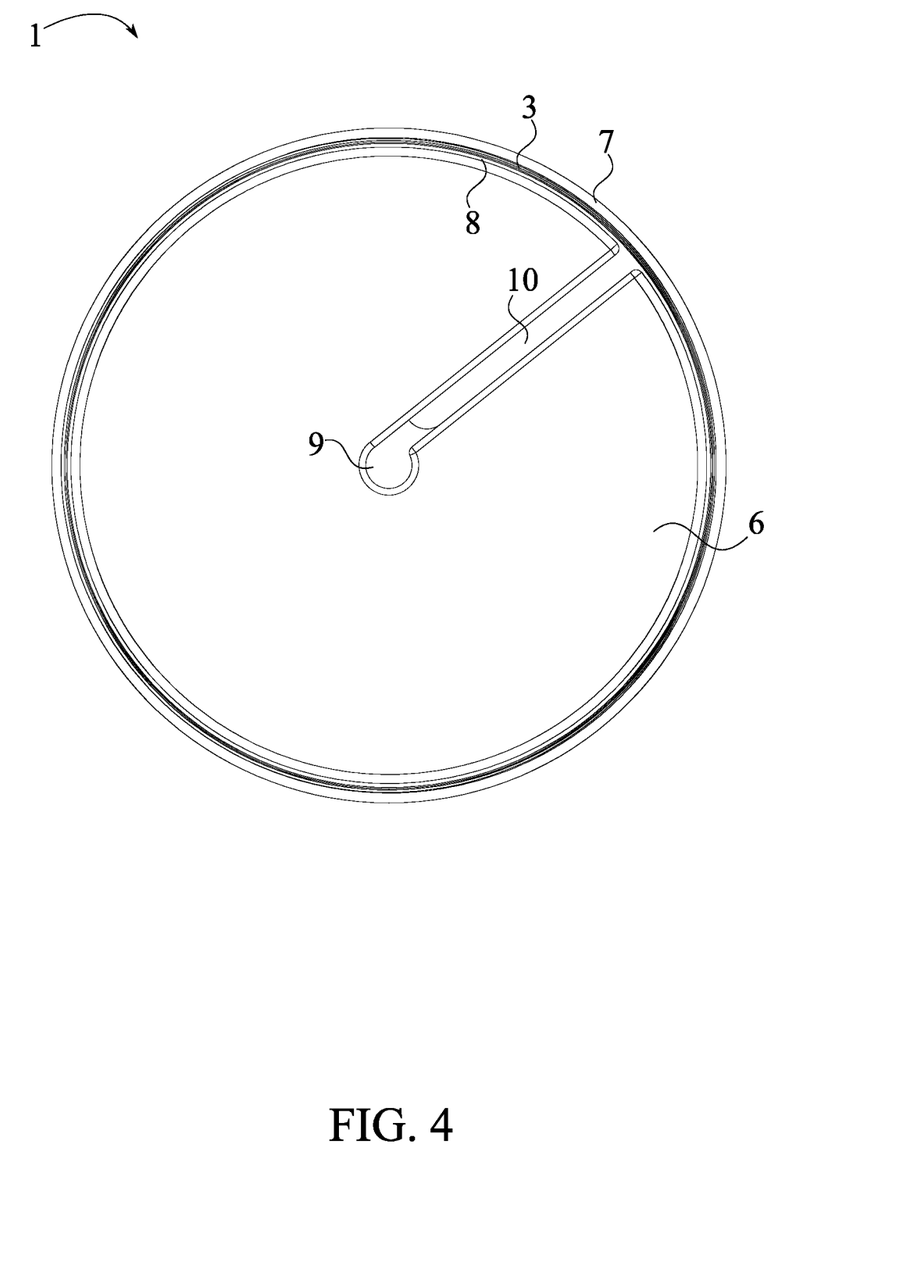
FIG. 4 is a top view of the container body.

Still in accordance to the preferred embodiment of the present invention, the container-compression blade 10 is tangentially connected to the container-blade support 9, detailed in FIG. 4, and the lid-compression blade 14 is tangentially connected to the lid-blade support 13, shown in FIG. 7. This configuration allows the lid-compression blade 14 to be positioned parallel and adjacent to the container-compression blade 10 as the lid-compression blade 14 is positioned within the container body 1 by the user. By utilizing this configuration, the compression of the perishable particles is optimized within the container body 1, such that the container-compression blade 10 allows for the lid-compression blade 14 to rotate approximately 270° when the lid 2 pivots about the lid-mounting extrusion 8.

Although the invention has been explained in relation to its preferred embodiment, it is to be understood that many other possible modifications and variations can be made without departing from the spirit and scope of the invention as hereinafter claimed.

What is claimed is:

1. A perishable particle compression container comprising:
   a container body;
   a lid;
   the container body comprising a container base, a lateral wall, a lid-mounting extrusion, a container-blade support, a plurality of fastening extrusions, the plurality of fastening extrusions including at least an upper fastening extrusion offset from a lower fastening extrusion, and a singular container-compression blade;
   the lid comprising a lid base, a container-mounting extrusion, a lid-blade support, a fastening channel, and a singular lid-compression blade;
   the lateral wall being perimetrically connected to the container base;
   the lid-mounting extrusion being connected around the lateral wall;
   the lid-mounting extrusion being oppositely positioned to the container base;
   the container-blade support being centrally and perpendicularly fixedly connected to the container base;
   the container-blade support and the lateral wall being oriented in the same direction;
   the lid-mounting extrusion having a first portion being tapered from the lateral wall;
   the lid-mounting extrusion having a second portion projecting towards the container-blade support;
   the container-compression blade being connected to the container-blade support, the container base, the lateral wall, and the lid-mounting extrusion;
   the container-blade support being cylindrical;
   the container-compression blade being tangentially fixedly connected to the container-blade support by a flat surface of the container-compression blade being tangentially aligned with a radial surface of the container-blade support;
   each of the plurality of fastening extrusions being perimetrically connected to the lid-mounting extrusion;
   the container-mounting extrusion being perimetrically connected to the lid base;
   the lid-blade support being centrally and perpendicularly fixedly connected to the lid base;
   the lid-blade support and the container-mounting extrusion being oriented in the same direction;
   the lid-compression blade being connected to the container-mounting extrusion, the lid-blade support, and the lid base;

the lid-blade support being cylindrical;

the lid-compression blade being tangentially fixedly connected to the lid-blade support by a flat surface of the lid-compression blade being tangentially aligned with a radial surface of the lid-blade support;

the fastening channel perimetrically and internally traversing into the container-mounting extrusion;

the container-mounting extrusion being releasably engaged with the lid-mounting extrusion;

each of the plurality of fastening extrusions of the container body configured to engage with the fastening channel of the lid, with the lower fastening extrusion being positioned between the lateral wall and the upper fastening extrusion, wherein in a pivoting configuration, the fastening channel of the lid engages with the upper fastening extrusion of the container body, and wherein in a locked configuration, the fastening channel of the lid engages with the lower fastening extrusion of the container body; and in response to the container-mounting extrusion being engaged with the lid-mounting extrusion, the lid-blade support being adjacently positioned to the container-blade support, the lid-blade support being concentrically positioned to the container-blade support, and the lid-compression blade being positioned within the lateral wall.

2. The perishable particle compression container, as claimed in claim 1, further comprising:
the lid-compression blade being oriented towards the container-mounting extrusion.

3. The perishable particle compression container, as claimed in claim 1, further comprising:
the lid-compression blade being oriented away from the lid base.

4. The perishable particle compression container, as claimed in claim 1, further comprising:
at least one grip opening,
the at least one grip opening traversing through the container-mounting extrusion; and
the fastening channel being positioned in between the at least one grip opening and the lid base.

5. The perishable particle compression container, as claimed in claim 4, further comprising:
the at least one grip opening further comprising a plurality of digit openings; and
each digit opening being perimetrically offset from one another about the container-mounting extrusion.

\* \* \* \* \*